E. H. PIPE.
MACHINE FOR MOLDING COMPOSITION BLOCKS.
APPLICATION FILED JULY 31, 1916.
1,300,645.
Patented Apr. 15, 1919.
3 SHEETS—SHEET 1.
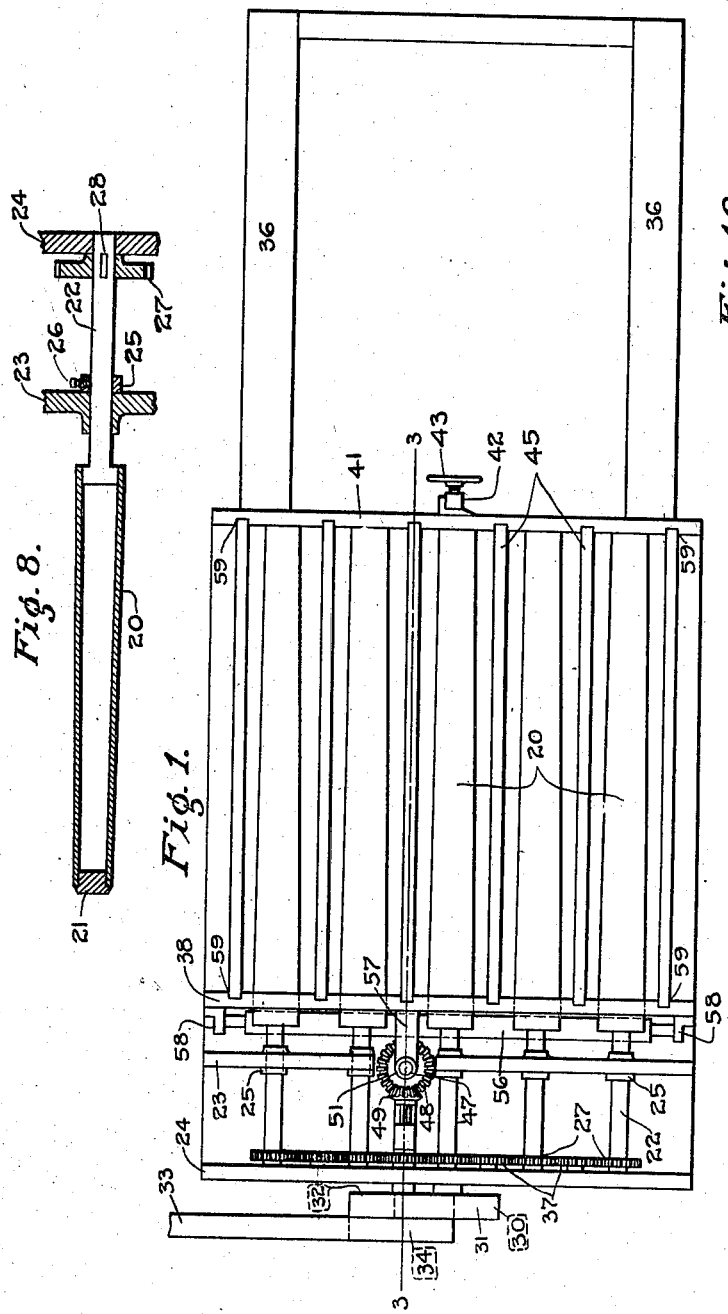
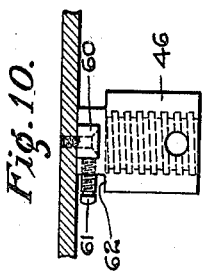
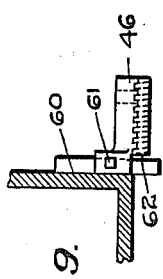
Inventor:
Edward H. Pipe
By James L. Hopkins,
Attorney.

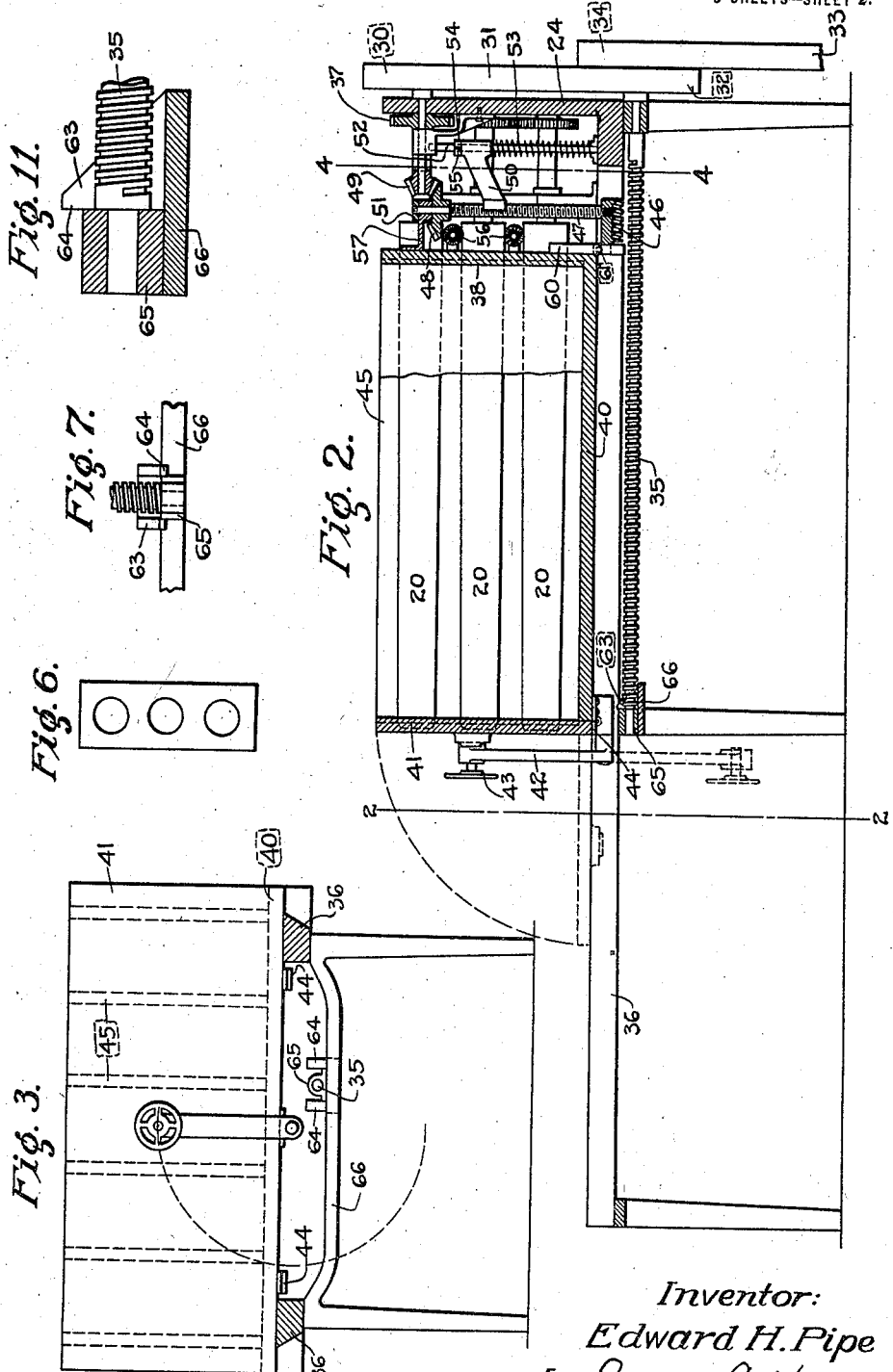

E. H. PIPE.
MACHINE FOR MOLDING COMPOSITION BLOCKS.
APPLICATION FILED JULY 31, 1916.
1,300,645.
Patented Apr. 15, 1919.
3 SHEETS—SHEET 3.
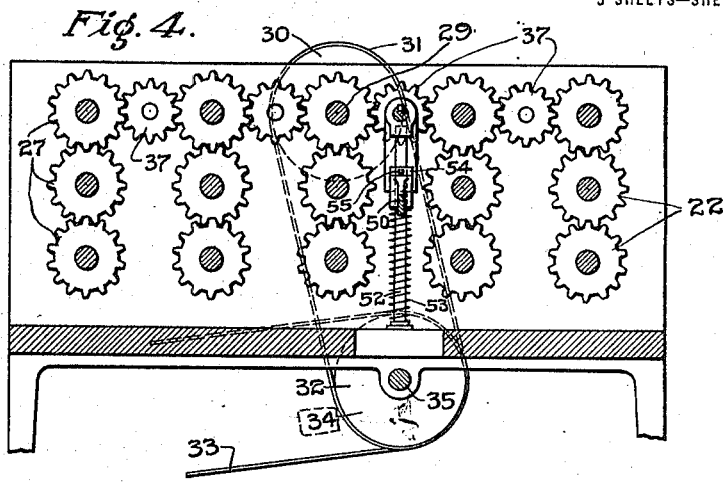
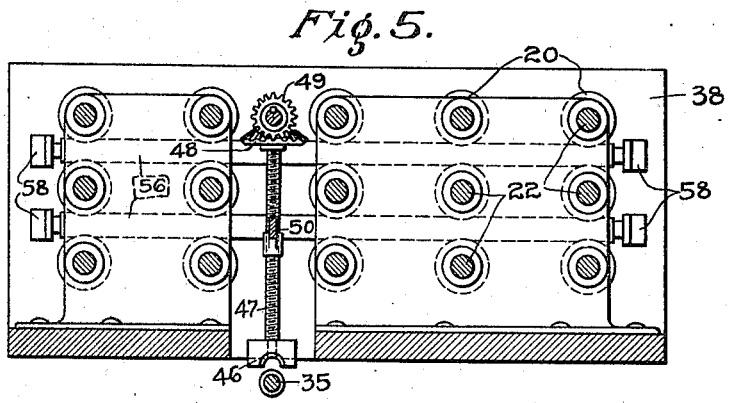
*Inventor:*
*Edward H. Pipe,*
*By James L. Hopkins,*
*Attorney.*

UNITED STATES PATENT OFFICE.

EDWARD H. PIPE, OF ST. LOUIS, MISSOURI.

MACHINE FOR MOLDING COMPOSITION BLOCKS.

1,300,645.   Specification of Letters Patent.   Patented Apr. 15, 1919.

Application filed July 31, 1916. Serial No. 112,272.

*To all whom it may concern:*

Be it known that I, EDWARD H. PIPE, a citizen of the United States, residing at St. Louis, State of Missouri, have invented certain new and useful Improvements in Machines for Molding Composition Blocks, of which the following is a specification, reference being had therein to the accompanying drawing.

My invention relates to a machine for molding composition blocks, particularly gypsum blocks, of the kind known in the art as hollow blocks. One object of my invention is to produce at a single operation a series of blocks molded about cores, which cores are prevented from adhering to the composition being formed about them, by means of mechanism imparting continuous movement to the core while the composition is setting. Another object of my invention is to provide means for withdrawing the hollow blocks from the cores about which they have been formed. A still further object of my invention is to provide means for cleansing the cores during that period of the operation of the machine following the withdrawal of the formed hollow blocks, in order to remove any particles of the composition accidentally adhering to said cores. Further functions and advantages incidental to my invention will be apparent from the following description.

In the drawings—

Figure 1 is a top plan view of a machine embodying my invention.

Fig. 2 is a longitudinal view of the same in vertical section, on the line 3—3 of Fig. 1.

Fig. 3 is an end elevation of the same looking toward the outer face of the front 41, the ways 36—36 being shown in section, on the line 2—2 of Fig. 2.

Fig. 4 is a transverse sectional view of the same, taken on the line 4—4 of Fig. 2.

Fig. 5 is a similar view, taken on the same line as Fig. 4, but in the opposite direction.

Fig. 6 is an end view of a hollow composition block produced by the machine.

Fig. 7 is a top view of the bearing 65.

Fig. 8 is a longitudinal sectional view of one of the cores 20.

Fig. 9 is a detailed view of the box 46 and guide 60.

Fig. 10 is a bottom view of the parts shown in Fig. 9.

Fig. 11 is a detailed view in section of the bearing 65.

In the machine illustrated I employ a core 20 (see the sectional view, Fig. 8) slightly tapering from its inner to its outer end, and at the latter closed by the plug 21; it is carried by the shaft 22, journaled through bearings in the inner wall 23 and outer wall 24, secured against longitudinal movement by the collar 25 and set screw 26 and rotated by means of the gear 27, mounted on the shaft 22 by means of the key 28.

The machine illustrated is adapted to produce blocks having three longitudinal perforations (see Fig. 6), and to produce five of said blocks at one operation, the cores 20 being employed in five groups, each group comprising three of said cores 20 mounted in vertical alinement. The center shaft 22, in the top row of said shafts (indicated as 29 in Fig. 4) is provided on the outer side of the wall 24 with the pulley 30, which is driven by means of the belt 31, from the pulley 34.

The shaft 35 is provided with the pulley 32 from which the belt 31 extends to the pulley 30. The pulley 34 is also mounted on ejector shaft 35 and is driven by the belt 33 from any suitable source of power; said shaft 35 being mounted beneath the ways 36 (see Fig. 2). The gears 27 are entrained in vertical series as shown in Fig. 4, and these series are connected at their tops by means of intermediate gear 37.

The cores 20 are journaled through the head 38, which is apertured to receive them, and which forms a mold in connection with the bottom 40, hinged front 41 and partitions 45. Said front 41 is held in position for the molding operation by means of the latch-bar 42 and locking handle 43; said front 41 being hinged to the bottom 40 by means of the hinge 44 to permit of it being swung into alinement with said bottom 40, to permit the withdrawal of the mold from the cores 20. In the machine illustrated five vertical and longitudinal compartments are formed by means of the vertical partitions 45.

During the formation of the hollow blocks, the mold above described is in the position illustrated in Fig. 2. When the blocks have been formed, the mold, consisting of the bottom 40 and its attached parts is carried forward by means of contact between the screw-threaded box 46 and the ejector-screw 35. The box 46 is mounted on the lower end of the vertical screw shaft 47, the upper extremity of said shaft 47 being mounted in the beveled gear 48, which beveled gear 48 intermeshes with the beveled gear 49 which in turn is constantly driven by one of the gears 37 as shown in Fig. 2. The timing of the operation by which the box 46 is carried downward into engagement with the ejector shaft 35 is accomplished by means of the fork 50, is provided with the collar 54 slidably mounted on the vertical rod 52, and subjected to the vertical thrust of the coiled spring 53 mounted on said rod 52. The collar 54 is held in place by the set screw 55, which permits the adjustment of the collar 54 and fork 50.

The cores 20 having been in constant rotary motion during the filling of the mold are prevented from adhering to the molded mass about them while the mold with its contents is being withdrawn to a point where the molded hollow blocks are clear of the cores 20. A pair of brushes 56 is secured to the head 38 in such position as to contact with the cores 20, and to cleanse them of any fragment of the composition adhering to said cores, said brushes 56 traveling along the length of the cores 20 as said cores are revolving and as the bottom 40 travels forward on the ways 36.

The vertical screw-shaft 47 is journaled at its upper extremity in the bracket 57, and held in place by the collar 51. The brushes 56 are journaled at their ends in brackets 58—58.

The partitions 45 are removably mounted between the front 41 and head 38, which front 41 and head 38 are grooved to receive the ends of said partitions 45, as indicated by the numeral 59.

The box 46 is slidably mounted upon the guide 60, which guide 60 is secured upon the rear face of the head 38 and at the lower edge thereof (see Figs. 2 and 9), said box 46 being provided with a set-screw 61 whose inner end contacts with the guide 60, creating sufficient friction to hold box 46 in its depressed position, and with its screw-threads contacting with the threads of the ejector shaft 35 when said box has been placed in depressed position by the operation of the screw shaft 47. The face of the fork 50 which contacts with the screw-shaft 47 is screw threaded to coöperate with screw-shaft 47.

As soon as the above described mold has been started and carried in its path of travel to a point where the teeth of the beveled gear 48 are carried out of engagement with the teeth of the beveled gear 49, the fork 50 will be disengaged from the screw-shaft 47 and spring back into position by the pressure of spring 53. The bottom 40 and the parts carried thereby will continue in said direction of travel until the box 46 reaches a point where its face 62 will engage with the inclined face 63 of the guide 64. The effect of said engagement is to elevate the box 46 out of operative contact with the shaft 35, whereupon the mold will be at rest upon the ways 36—36, and said mold will so remain at rest until its contents have been removed, when it will be thrust by hand backward to the position indicated in Fig. 2, in which the beveled gears 48 and 49 are in operative contact.

The guide 64 is made integral with the bearing 65 in which the front end of the ejector-shaft 35 is journaled; the bearing 65 being mounted upon the brace 66 (see Fig. 3).

The movement of the core 20, to prevent the composition adhering thereto while the block is forming, may be accomplished by any suitable agitating, rotating or vibrating mechanism, all that is necessary or desirable being sufficient movement, relative to the mass of composition, to avoid adhesion and render it possible to withdraw the formed block from the core without impairment of the surface of the aperture formed by the core.

Having thus described my invention, what I claim as new and desire to have secured to me by the grant of Letters Patent, is—

1. In a machine for making composition blocks, a mold comprising an apertured head, a bottom, a hinged front and vertical partitions; cores mounted independently of said mold and extending through the apertures in said head; means for imparting constant rotary motion to said cores; mechanism for moving the mold with relation to said cores; and a timing mechanism arranged to effect said movement periodically.

2. In a machine for making composition blocks, a mold comprising an apertured head, a bottom, a hinged front and vertical partitions; cores mounted independently of said mold and extending through the apertures in said head; means for imparting constant rotary motion to said cores; mechanism for moving the mold with relation to said cores; a timing mechanism arranged to effect said movement periodically, and brushes so secured to said head as to contact with the cores during the movement of said head.

In testimony whereof I hereunto affix my signature in the presence of two witnesses.

EDWARD H. PIPE.